(12) United States Patent
Katsumata et al.

(10) Patent No.: US 6,266,166 B1
(45) Date of Patent: Jul. 24, 2001

(54) SELF-ADHESIVE FILM FOR HOLOGRAM FORMATION, DRY PLATE FOR PHOTOGRAPHING HOLOGRAM, AND METHOD FOR IMAGE FORMATION USING THE SAME

(75) Inventors: Masaki Katsumata; Kenji Ueda; Yasuyuki Oyagi, all of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/519,352

(22) Filed: Mar. 6, 2000

(30) Foreign Application Priority Data

Mar. 8, 1999 (JP) .................................................. 11-060209

(51) Int. Cl.[7] ...................................................... G03H 1/02
(52) U.S. Cl. .......................... 359/3; 359/12; 156/244.27; 156/324.4
(58) Field of Search ............... 359/1, 3, 12; 156/244.27, 156/324.4

(56) References Cited

U.S. PATENT DOCUMENTS 5,993,600 * 11/1999 Ueda et al. ............................. 359/14
6,020,983 * 2/2000 Neu et al. ............................... 359/14

* cited by examiner

Primary Examiner—Darren Schuberg
(74) Attorney, Agent, or Firm—Parkhurst & Wendel, L.L.P.

(57) ABSTRACT

There are provided a self-adhesive film for hologram formation, a dry plate for photographing a hologram, and a method for image formation using the same, which, when a pressure-sensitive adhesive layer is provided as an antireflection layer for the prevention of halation at the time of exposure for hologram recording, the effect of preventing halation can be attained even when a hologram-recording light is admitted at a low angle as viewed from the interfacial boundary. Specifically, the present invention include: a self-adhesive film for hologram formation, comprising a support film and a pressure-sensitive adhesive layer provided on the support film, the pressure-sensitive adhesive layer comprising a pressure-sensitive adhesive composition containing a pressure-sensitive adhesive, the pressure-sensitive adhesive composition further containing a modifier capable of regulating the refractive index and/or adhesive strength of the pressure-sensitive adhesive composition; and a dry plate for photographing a hologram and a method for image formation using the same.

12 Claims, 3 Drawing Sheets

SELF-ADHESIVE FILM FOR HOLOGRAM FORMATION, DRY PLATE FOR PHOTOGRAPHING HOLOGRAM, AND METHOD FOR IMAGE FORMATION USING THE SAME

TECHNICAL FIELD

The present invention relates to a self-adhesive film or hologram formation, a dry plate for photographing a hologram, and a method for image formation using the same. More particularly, the present invention relates to a self-adhesive film for hologram formation, provided with a layer for the prevention of halation at the time of photographing or duplication of holograms, a dry plate for photographing a hologram, and a method for image formation using the same. The present invention can be applied to the field of image formation, the field of optical elements, picture puzzles and the like.

BACKGROUND OF THE INVENTION

Holograms have been used for display of three-dimensional images, measurement, optical elements and other applications. Mass duplication of holograms on a commercial scale has hitherto been carried out as follows.

Calculation is first carried out by means of a computer so that holograms can surely have necessary properties. The results of calculation are written by means of an electron beam exposure system to prepare a first original plate for a hologram.

Separately, a recording material for hologram formation is coated onto a glass substrate to form a recording material layer for hologram formation, thereby providing a dry plate for photographing a hologram. The original plate for a hologram and the dry plate for photographing a hologram are put on top of each other in such a manner that the original plate for a hologram on its hologram face comes into contact with the recording material layer for hologram formation in the dry plate for photographing a hologram. This is followed by exposure of the assembly to a laser beam through the original plate for a hologram.

The exposure causes interference of first-order diffracted light, which has been diffracted by a diffraction grating of the hologram in the original plate for a hologram, with zero-order diffracted light, which has traveled substantially straight, within the recording material layer for hologram formation. This creates fringes, and polymerization occurs within the recording material layer for hologram formation according to the fringes.

After the exposure, necessary development is carried out to duplicate the hologram in the original plate onto the recording material layer for hologram formation, coated on the glass substrate.

The duplicated hologram is in some cases used as such. In other cases, this duplicated hologram is used as an original plate for duplication. Specifically, a dry plate for photographing a hologram as described above is provided, and the original plate for duplication on its hologram side is disposed so as to face the recording material layer for hologram formation in the dry plate for photographing a hologram, followed by exposure in the same manner as described above. In this way, holograms are mass produced.

A hologram, wherein illumination light for reproduction is admitted from one side of the hologram and the diffracted light goes out from the opposite side of the hologram, is known as a transmission hologram. In photographing or duplicating a transmission hologram, an object light and a reference light are admitted from the front side of the dry plate for photographing a hologram. The object light and the reference light, which have reached the back side of the dry plate, are reflected from the back side of the dry plate to cause halation. Due to the halation, unnecessary interference fringes are recorded, resulting in deteriorated reproduction properties of the hologram.

For this reason, in general, a layer for absorbing a transmitted laser beam (an antihalation layer) has hitherto been provided on the back surface of the dry plate for photographing a transmission hologram to reduce the occurrence of undesired interference fringes attributable to the reflection of the laser beam from the back surface of the dry plate. The antihalation layer is generally formed by coating a resin solution containing a dye dissolved therein and drying the coating. An example of the dye-containing resin solution is a solution prepared by admixing a suitable amount of a dye into a methyl ethyl ketone solution of polyvinyl butyral (PVB).

The above conventional method for the formation of an antihalation layer by coating, however, involves the following problems. Specifically, the resin solution should be coated followed by drying of the coating. This, for example, complicates the process and deteriorates the productivity. At the same time, the coating solution migrates to the opposite side of the dry plate to soil the surface of recording material for hologram formation. Further, for applications where a high level of cleanness is required, for example, the step of wiping off and completely removing the antihalation layer with a solvent should be additionally provided after recording the hologram.

In order to solve the above problems of the prior art, Japanese Patent Laid-Open No. 54539/1997 proposes a self-adhesive film for hologram formation, a dry plate for photographing a hologram, and a method for image formation using the same, wherein the antihalation layer is in a dry film form which can significantly simplify the production process as compared with the conventional production process and, after recording a hologram, can be completely removed by a simple step.

Further, in the photographing or duplication of reflection holograms, reference light is admitted through the surface of the dry plate for photographing a hologram, while object light (diffracted light from an object or an original plate for a hologram) is admitted through the back surface. In this case, the object light or the reference light, which had reached the air/dry plate interface in the dry plate, is subjected to interface reflection to cause halation. As a result, unnecessary interference fringes are recorded, resulting in deteriorated hologram reproduction properties. For this reason, in general, an antireflection glass or a color glass (ND (=neutral density) glass) for interface reflection prevention purposes is installed on the surface of the air/dry plate in the dry plate for a reflection hologram.

The antireflection glass or the color glass is stacked on the air/dry plate interface through an optical liquid for intimate contact. In this case, the optical liquid for intimate contact cannot easily form an evenly thick coating due to flow, vibration, inclusion of air or the like. In particular, when the amount of the liquid for intimate contact is large, the time elapsed until, after coating, the flow ceases and becomes stable, is long, resulting in poor workability. In order to overcome this drawback, for example, Japanese Patent Laid-Open Nos. 281883/1993, 281583/1995, and 114329/1995 propose methods wherein a flexible color film or antireflection film is used instead of the glass to prepare a dry plate for a hologram without use of the liquid for intimate contact.

In the above conventional methods for hologram formation, however, the use of a pressure-sensitive adhesive for bringing the antihalation layer into a dry film form poses a problem that the refractive index of conventional pressure-sensitive adhesives is about 1.4 to 1.46 which is greatly different from the refractive index of the transparent substrate supporting the recording material layer for hologram formation, about 1.52, leading to reflection at the interface of the transparent substrate and the pressure-sensitive adhesive layer and consequently unsatisfactory prevention of halation by the pressure-sensitive adhesive layer.

The present inventors have further found that, in the case of hologram formation using the conventional antihalation layer formed of a pressure-sensitive adhesive, the reflected light is rapidly increased when the angle of incidence of the hologram recording light exceeds 50 degrees, particularly 55 degrees, that is, when the hologram recording light is admitted at a low angle as viewed from the interfacial boundary.

SUMMARY OF THE INVENTION

It is an object of the present invention to provide a self-adhesive film, for hologram formation, using a pressure-sensitive adhesive in an antihalation layer, a dry plate for photographing a hologram, and a method for image formation using the same, wherein the effect of preventing halation by the pressure-sensitive adhesive layer is satisfactory and, in addition, the effect of preventing halation can be attained even when the angle of incidence of the hologram recording light exceeds 50 degrees, particularly 55 degrees, that is, when the hologram recording light is admitted at a low angle as viewed from the interfacial boundary.

In order to attain the above object, according to one aspect of the present invention, there is provided a self-adhesive film for hologram formation, comprising:
  a support film; and
  a pressure-sensitive adhesive layer provided on the support film, the pressure-sensitive adhesive layer comprising a pressure-sensitive adhesive composition containing a pressure-sensitive adhesive,
  the pressure-sensitive adhesive composition further containing a modifier capable of regulating the refractive index and/or adhesive strength of the pressure-sensitive adhesive composition.

According to a preferred embodiment of the present invention, the pressure-sensitive adhesive composition contains 40 to 90% by weight of the pressure-sensitive adhesive and 10 to 60% by weight of a tackifier resin, thereby matching the refractive index of the pressure-sensitive adhesive layer to the refractive index of a transparent substrate for supporting a recording material layer for hologram formation.

In the self-adhesive film for hologram formation having the above construction, according to the present invention, a separator removable in use of the self-adhesive film may be provided on the surface of the pressure-sensitive adhesive layer remote from the support film.

Further, according to the present invention, the pressure-sensitive adhesive composition and/or the support film may further contain a colorant.

According to a preferred embodiment of the present invention, the pressure-sensitive adhesive composition is to be used in the formation of a pressure-sensitive adhesive layer in a dry plate for photographing a hologram, the dry plate comprising at least a recording material layer for hologram formation, a transparent substrate, a pressure-sensitive adhesive layer, and a support film stacked in that order as viewed from the dry plate in its side through which a hologram-recording light enters, the pressure-sensitive adhesive layer having a light reflectance of 0.01 to 1% as measured at a 50 to 65-degree angle of incidence of the hologram-recording light to the recording material layer for hologram formation.

Preferably, the self-adhesive film for hologram formation according to the present invention is to be used in a dry plate for photographing a hologram, having a layer construction of recording material layer for hologram formation/transparent substrate/pressure-sensitive adhesive layer/support film, and the refractive index has been matched so that the difference in refractive index between the pressure-sensitive adhesive layer and the transparent substrate is not more than 0.03.

According to another aspect of the present invention, there is provided a dry plate for photographing a hologram, comprising recording material layer for hologram formation/transparent substrate/pressure-sensitive adhesive layer/support film, the above self-adhesive film for hologram formation being used in a laminate structure of pressure-sensitive adhesive layer/support film in the dry plate.

According to a further aspect of the present invention, there is provided a method for image formation, comprising the steps of:
  forming a pressure-sensitive adhesive layer comprising a pressure-sensitive adhesive composition containing a pressure-sensitive adhesive on a support film to prepare a self-adhesive film for hologram formation, the pressure-sensitive adhesive composition containing a modifier capable of regulating the refractive index and/or adhesive strength of the pressure-sensitive adhesive composition;
  applying the self-adhesive film onto a laminate having a layer construction of recording material layer for hologram formation/transparent substrate in such a manner that the self-adhesive film, either after the removal of a separator when the self-adhesive film has the separator applied thereto or as such when the self-adhesive film has no separator, in its pressure-sensitive adhesive layer side free from the separator, is applied onto the transparent substrate side of the laminate, thereby preparing a dry plate for photographing a hologram having a layer construction of recording material layer for hologram formation/transparent substrate/pressure-sensitive adhesive layer/support film;
  bringing an original plate for a transmission hologram into intimate contact with the dry plate for photographing a hologram through an index matching liquid in such a manner that the hologram-recorded face in the original plate faces the recording material layer for hologram formation in the dry plate;
  admitting a hologram-recording light and a reference light into the original plate for a hologram, thereby exposing the recording material layer for hologram formation;
  developing the exposed recording material layer for hologram formation by the application of an ultraviolet or heat radiation; and
  separating the self-adhesive film having a layer construction of pressure-sensitive adhesive layer/support film.

According to the above preferred embodiment of the present invention, the pressure-sensitive adhesive layer formed of a pressure-sensitive adhesive composition, with a matched refractive index, comprising 40 to 90% by weight of the pressure-sensitive adhesive and 10 to 60% by weight of the tackifier resin, preferably comprising 40 to 90% by weight of the pressure-sensitive adhesive and 20 to 60% by weight of the tackifier resin, can be used in the prevention of halation at the time of hologram formation. Therefore, matching the refractive index of the pressure-sensitive adhesive layer so as to reduce the difference in refractive index between the transparent substrate and the pressure-sensitive adhesive layer can satisfactorily cope with the requirement for the prevention of halation at the interface of the transparent substrate and the pressure-sensitive adhesive layer and, in addition, enables the effect of preventing halation to be attained even when the angle of incidence of the hologram recording light exceeds 50 degrees, particularly 55 degrees, that is, when the hologram recording light is admitted at a low angle as viewed from the interfacial boundary. Thus, even when the light is admitted at a low angle as viewed from the interfacial boundary, the halation can be prevented. Therefore, the self-adhesive film for hologram formation and the dry plate for photographing a hologram according to the present invention are suitable for use in fields where a hologram is formed with light being admitted at a low angle as viewed from the interfacial boundary using a prism, for example, in the field of forming pattern puzzles and images and in the field of optical elements.

Since the self-adhesive film for hologram formation according to the present invention has a laminate structure of pressure-sensitive adhesive layer/support film having the above features, a layer for preventing halation can be simply provided in a dry film form at the time of photographing or duplication of holograms. This can significantly simplify the production process, and the compatibility with a laminator is good. Further, the dry plate for photographing a hologram per se is not soiled, and the antihalation layer can be completely removed by a simple step after recording.

DESCRIPTION OF THE PREFERRED EMBODIMENTS

The self-adhesive film for hologram formation, the dry plate for photographing a hologram, and the method for image formation using the same according to the present invention will be described in more detail.

Figure 1:
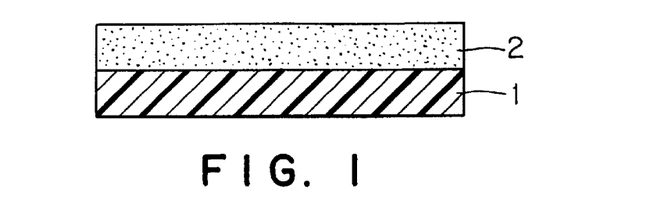
FIG. 1 is a cross-sectional view showing the layer construction of a self-adhesive film for hologram formation according to an embodiment of the present invention.
Figure 2A:
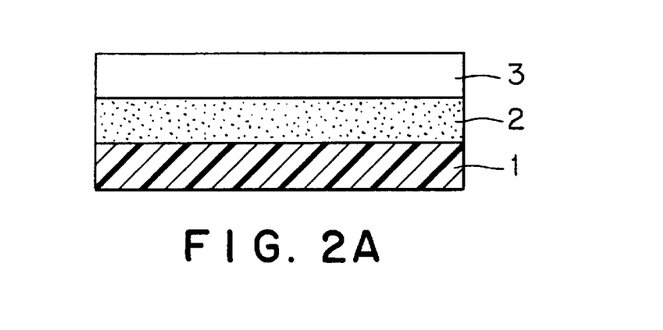
FIGS. 2A and 2B are cross-sectional views showing the layer construction of self-adhesive films for hologram formation according to another embodiment of the present invention, wherein a separator is provided.
Figure 2B:
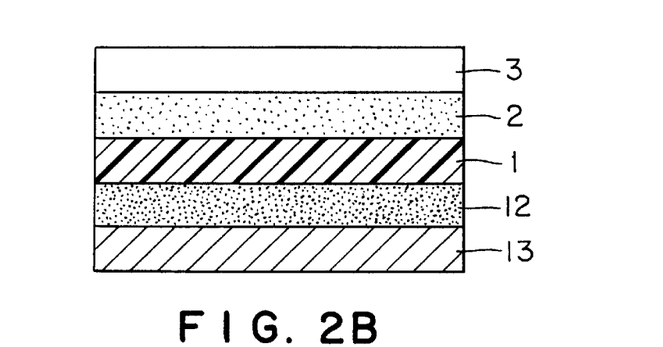

FIGS. 1 and 2 show the layer construction of the self-adhesive films for hologram formation according to the present invention. In FIG. 1, numeral 2 designates a pressure-sensitive adhesive layer formed of a pressure-sensitive adhesive composition comprising 40 to 90% by weight of a pressure-sensitive adhesive and 10 to 60% by weight of a tackifier resin, preferably comprising 40 to 80% by weight of a pressure-sensitive adhesive and 20 to 60% by weight of a tackifier resin, which function to match the refractive index. Numeral 1 designates a support film for supporting the pressure-sensitive adhesive layer 2.

As shown in FIG. 2A, according to the self-adhesive film for hologram formation of the present invention, a separator 3, which functions to protect the pressure-sensitive adhesive layer 2 and can be easily removed in use of the self-adhesive film, may be provided on the surface of the pressure-sensitive adhesive layer 2 remote from the support film 1.

According to the embodiment shown in FIG. 2B, a second pressure-sensitive adhesive layer 12 and a second support film 13 are provided on the surface of the support film 1 remote from the separator. In general, in the step of laminating the self-adhesive film for hologram formation, the separation of the separator 3 from the interface of the pressure-sensitive adhesive layer 2 sometimes causes the formation of a peel line or the like, and, in addition, lamination of the self-adhesive film onto the transparent substrate 6 causes inclusion of air bubbles or the like. This adversely affects the quality of finally formed holograms. Increasing the thickness of the support film 1 to impart nerve to the film is effective in solving this problem. Further, as shown in FIG. 2B, the lamination of the second pressure-sensitive layer 12 and the second support film 13 onto the surface of the support film 1 remote form the pressure-sensitive adhesive layer 2 can impart nerve to the whole film and, at the same time, can increase the cushioning properties at the time of lamination to further improve the lamination quality.

Figure 3:
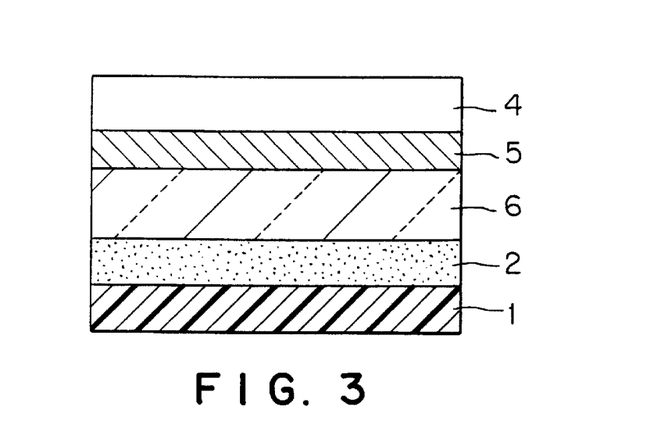
FIG. 3 is a cross-sectional view showing the layer construction of a dry plate for photographing a hologram according to an embodiment of the present invention.

FIG. 3 shows the layer construction of a dry plate for photographing a hologram according to the present invention. In FIG. 3, a laminate of the support film 1 and the pressure-sensitive adhesive layer 2 is the self-adhesive film for hologram formation shown in FIG. 1 or a laminate after the removal of the separator 3 from the self-adhesive film for hologram formation shown in FIG. 2. Numeral 4 designates a protective layer which functions to support and protect a recording material layer for hologram formation, numeral 5 a recording material layer for hologram formation, and numeral 6 a transparent substrate.

The dry plate for photographing a hologram according to the present invention may be produced by applying a self-adhesive film, comprising a pressure-sensitive adhesive layer 2 supported on a support film 1, onto one side of a transparent substrate 6 and applying a recording material layer 5 for hologram formation, supported on a protective layer 4, onto the other side of the transparent substrate 6. When the pressure-sensitive adhesive layer 2 has thereon a separator 3, or when the recording material layer 5 for hologram formation has thereon a separator (not shown), the separator is removed before the lamination of these members.

Figure 4:
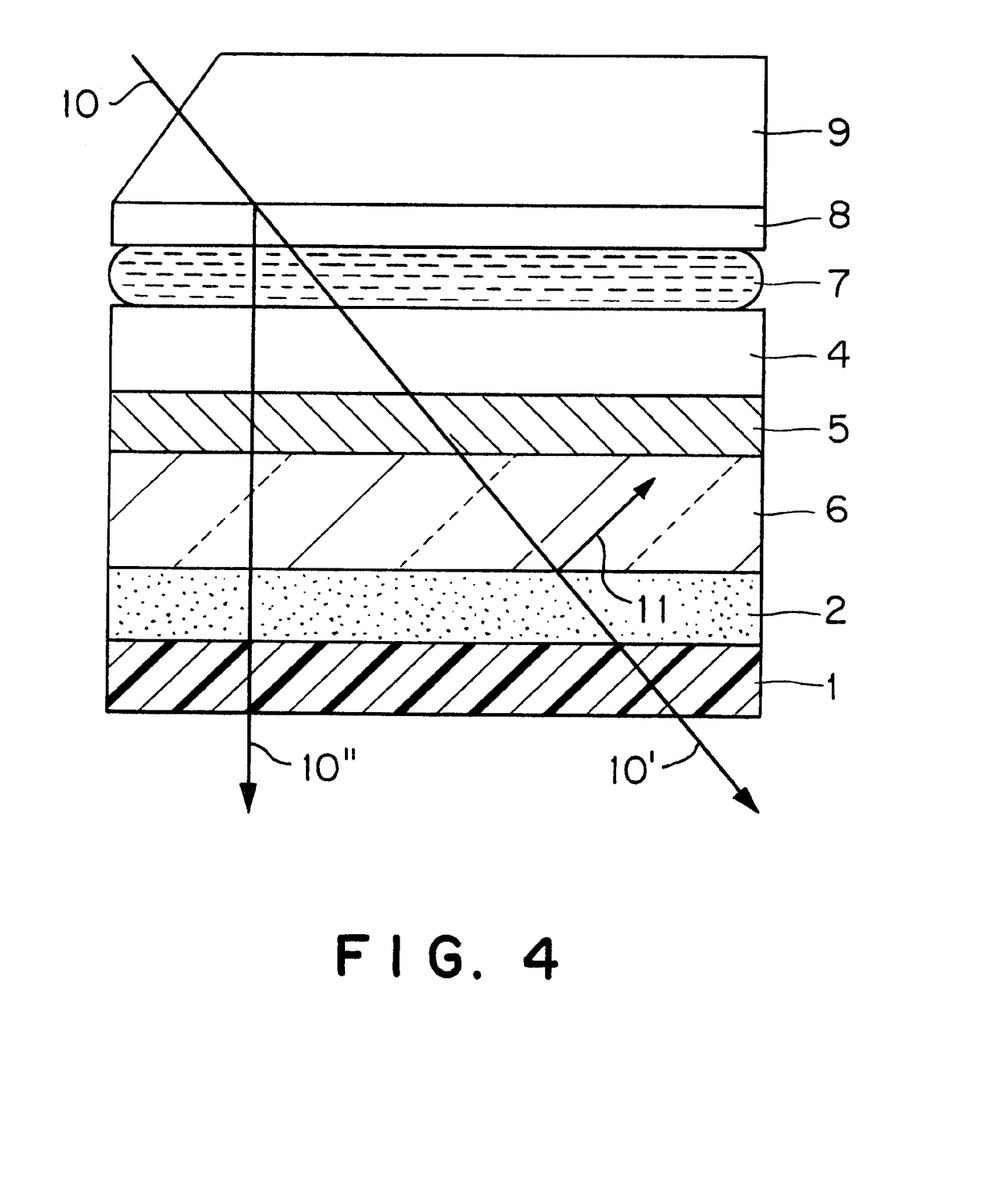
FIG. 4 is a cross-sectional view showing the state of exposure of the dry plate for photographing a hologram according to an embodiment of the present invention.

FIG. 4 is a cross-sectional view showing the state of exposure of a dry plate for photographing a hologram according to the present invention. As shown in FIG. 4, if necessary, an index matching liquid 7 may be coated onto the protective layer 4 in the dry plate for photographing a hologram according to the present invention shown in FIG. 3, followed by stacking of an original plate 8 for a hologram and the dry plate for photographing a hologram on top of the other and intimate contact of them with each other in such a manner that the hologram face in the original plate 8 for a hologram parallelly faces the recording material layer 5 for hologram formation in the dry plate for photographing a hologram. In this connection, it should be noted that, when a relief hologram is used as an original plate, the index matching liquid is not used between the recording material and the original plate. Further, a prism 9 is disposed on the original plate 8 for a hologram so that the angle of incidence of a hologram-recording light is 40 to 75 degrees.

The recording layer for hologram formation is exposed to a laser beam 10 at various angles of incidence through the surface of the original plate 8 for a hologram remote from the hologram face. The exposure is carried out, for example, by admitting a beam 10 of laser, such as argon laser (wavelength 514.5 nm). This exposure causes a laser beam 10", diffracted by the original plate 8 for a hologram, to interfere with a laser beam 10', which has traveled without diffraction, to provide hologram information into the recording material layer 5 for hologram formation. In this case, the reflection of light 11 at the interface of the transparent substrate 6 and the pressure-sensitive adhesive layer 2 is suppressed. Thus, halation does not occur.

Relationship Between Angle of Incidence and Light Reflectance with Refractive Index of Pressure-sensitive Adhesive Layer Being Varied Light was admitted at various angles of incidence into pressure-sensitive adhesive layers with various refractive indexes in contact with a transparent substrate having a refractive index of 1.522 (normal transmission=10%) through the transparent substrate to measure the light reflectance at the interface of the transparent substrate and the pressure-sensitive adhesive layer. In this case, seven types of pressure-sensitive adhesive layers respectively having refractive indexes of 1.47, 1.48, 1.49, 1.5, 1.51, 1.52, and 1.53 were used. The results are shown in a graph of FIG. 5 wherein the light reflectance is plotted as ordinate against the angle of incidence as abscissa.

Figure 5:
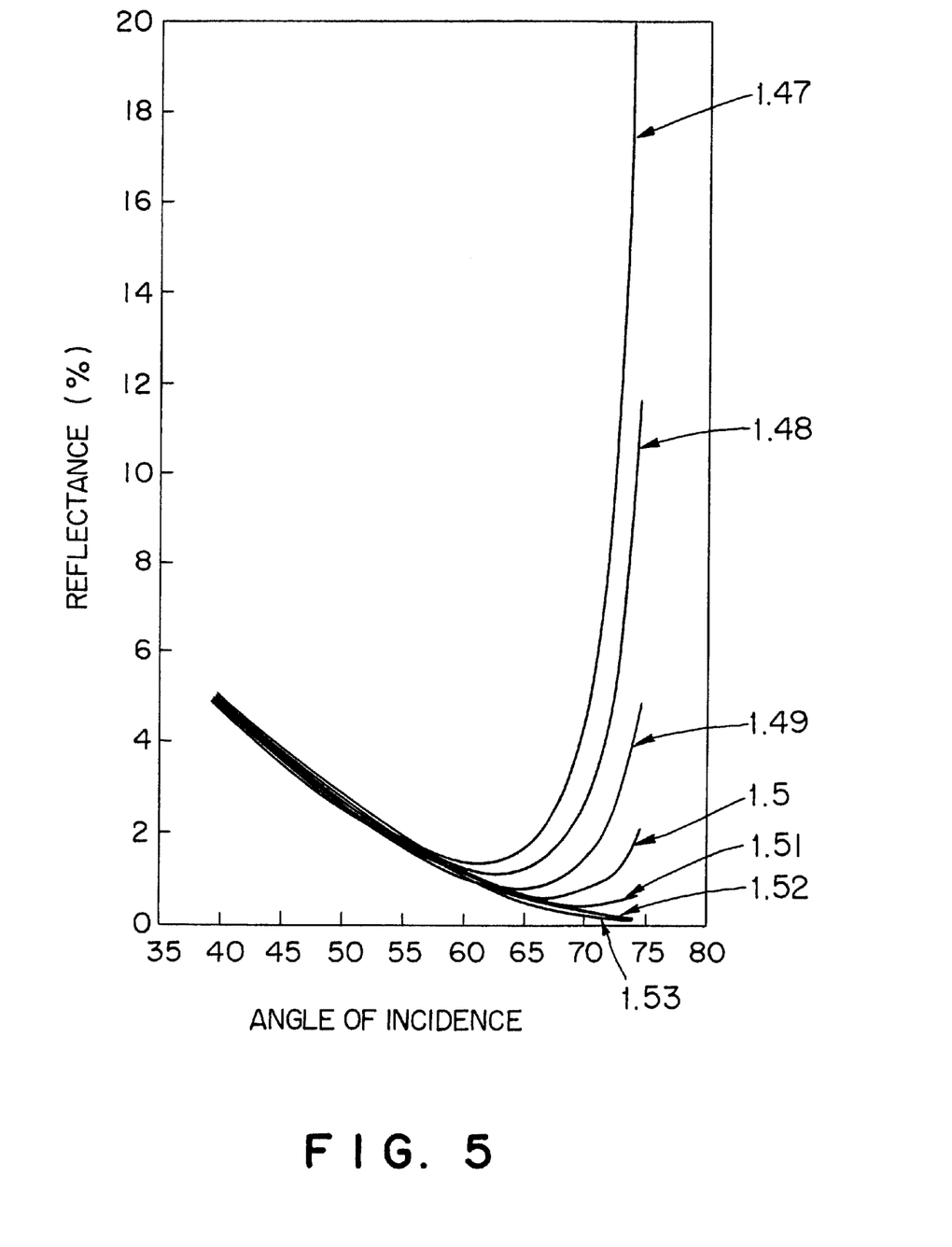
FIG. 5 is a diagram showing the relationship between the angle of incidence of light and the light reflectance at the transparent substrate/pressure-sensitive adhesive layer interface in the case where light has been admitted at various angles of incidence into a pressure-sensitive adhesive layer having various refractive indexes in contact with a transparent substrate having a refractive index of 1.522 through the transparent substrate.

As can be seen from FIG. 5, until the angle of incidence of light reaches 60 degrees, the light reflectance decreases in reverse proportion to the angle of incidence. When the angle of incidence of light exceeds 60 degrees, the light reflectance decreases or increases. When the refractive index of the transparent substrate is close to the refractive index of the pressure-sensitive adhesive layer, the light reflectance is reduced to a negligible level at an angle of incidence of light exceeding 60 degrees.

Accordingly, preferably, the refractive index of the pressure-sensitive adhesive composition used in the pressure-sensitive adhesive layer in the self-adhesive film for hologram formation according to the present invention is regulated so that the difference in refractive index between the pressure-sensitive adhesive layer and the transparent substrate supporting the recording material layer for hologram formation is not more than 0.03.

Support Film

Support films suitable for use in the self-adhesive film for hologram formation according to the present invention include various films, such as PET films (particularly PET films in optical grade), triacetyl cellulose films, polypropylene films, polyethylene films, polyvinyl chloride films, acrylic films, polyvinyl alcohol films, polyethylene/vinyl alcohol copolymer films, and co-extruded films of materials constituting the above films.

The refractive index of the support film is preferably substantially equal to that of the pressure-sensitive adhesive layer, and is particularly preferably such that the difference in refractive index between the support film and the pressure-sensitive adhesive layer is not more than 0.03. When the pressure-sensitive adhesive layer is a colored one, however, this requirement for the refractive index difference is relaxed.

Pressure-sensitive Adhesive Layer

The pressure-sensitive adhesive layer in the self-adhesive film for hologram formation according to the present invention is preferably formed of a pressure-sensitive adhesive composition containing 40 to 90% by weight of the pressure-sensitive adhesive and 10 to 60% by weight of a tackifier resin, more preferably containing 40 to 90% by weight of the pressure-sensitive adhesive and 20 to 60% by weight of the tackifier resin, whereby the refractive index of the pressure-sensitive adhesive layer is matched to the refractive index of the transparent substrate. This mixing ratio of the tackifier resin is much higher than that of tackifier resins commonly compounded in conventional pressure-sensitive adhesives. When the amount of the tackifier resin is less than 10% by weight, the function of matching the refracting index of the pressure-sensitive adhesive layer to that of the transparent substrate cannot be provided. On the other hand, when the amount of the tackifier resin exceeds 60% by weight, disadvantageously, the adhesive strength of the pressure-sensitive adhesive is excessively lowered.

Further, it should be noted that the refractive index of conventional pressure-sensitive adhesives is about 1.4 to 1.46, while the refractive index of conventional transparent substrates in dry plates for photographing a hologram is, for example, about 1.52. This large difference in refractive index between the press-sensitive adhesive and the transparent substrate poses a problem of the prior art that light reflection is likely to occur at the interface of the pressure-sensitive adhesive layer and the transparent substrate. By contrast, according to the present invention, since the tackifier resin has a refractive index of about 1.5 to 1.65 (about 1.60), the compounding of the tackifier resin in a large amount of 10 to 60% by weight into 40 to 90% by weight of the pressure-sensitive adhesive, preferably the compounding of the tackifier resin in a large amount of 20 to 60% by weight into 40 to 90% by weight of the pressure-sensitive adhesive, in the preparation of the pressure-sensitive adhesive composition for the pressure-sensitive adhesive layer in the self-adhesive film for hologram formation can eliminate the problem of the difference in refractive index between the pressure-sensitive adhesive layer and the transparent substrate, thereby preventing the reflection of light at the interface of the pressure-sensitive adhesive layer and the transparent substrate.

However, when the matching of the refractive index of the pressure-sensitive adhesive layer to the refractive index of the transparent substrate and the regulation of the adhesive strength of the pressure-sensitive adhesive to a desired adhesive strength range are contemplated, any material other than the tackifier resin may be added so far as the material can attain these objects. The refractive index of the transparent substrate varies depending upon the type of the material constituting the transparent substrate. Therefore, in order to match the refractive index of the pressure-sensitive adhesive layer to the refractive index of the transparent substrate, it is not always necessary for the material for regulating the refractive index to be a material, like the tackifier resin, having a higher refractive index than the pressure-sensitive adhesive. Further, a material having a higher refractive index than the pressure-sensitive adhesive may be added in combination with a material having a lower refractive index than the pressure-sensitive adhesive to the pressure-sensitive adhesive. In short, any material can be used which can match the refractive index of the pressure-sensitive adhesive layer to the refractive index of the transparent substrate to prevent the occurrence of halation and, in addition, when added to the pressure-sensitive adhesive, permits the pressure-sensitive adhesive layer to have suitable adhesion to the transparent substrate (that is, to have a property such that the pressure-sensitive adhesive layer, when stacked onto the transparent substrate, can maintain adhesive strength high enough to be easily stacked onto transparent substrate and, at the same time, when separated from the transparent substrate, can be easily removed from the transparent substrate.

When the separability of the pressure-sensitive adhesive layer is taken into consideration, the peel strength from the transparent substrate is generally 5 to 300 g/25 mm, preferably 10 to 100 g/25 mm. When the peel strength is lower than the lower limit of the above strength range, the pressure-sensitive adhesive is likely to be exfoliated (or, for example, to be peeled off) in the course of the process. On the other hand, when the peel strength is higher than the upper limit of the above strength range, the pressure-sensitive adhesive layer cannot be mechanically separated from the transparent substrate without difficulty. When the pressure-sensitive layer is separated after development, for example, by the application of an ultraviolet or heat radiation, it is a matter of course that the peel force after the processing history is preferably as described above. Further, the cohesive force of the pressure-sensitive adhesive is also important, and should be on a level that does not remain (that is, does not cause adhesive transfer) on the substrate upon the separation of the pressure-sensitive adhesive layer from the substrate.

The tackifier resin is contained in a much larger amount than the amount of the tackifier resin compounded in conventional pressure-sensitive adhesives, and thus functions to lower the adhesive strength of the pressure-sensitive adhesive. According to the present invention, by virtue of the presence of the tackifier resin in the above high content range, the pressure-sensitive adhesive layer can exhibit good releasability when the self-adhesive film is separated after the light exposure of the recording material layer for hologram formation and development.

Pressure-sensitive adhesives usable for the formation of the pressure-sensitive adhesive layer in the self-adhesive film for hologram formation according to the present invention include acrylic resin, acrylic ester resin or acrylic or acrylic ester copolymer, styrene-butadiene copolymer, naturally occurring rubbers, casein, gelatin, rosin ester, terpene resin, phenolic resin, styrene resin, coumarone-indene resin, polyvinyl ether, and silicone resin. Additional examples thereof include α-cyanoacrylate, silicone, maleimide, styrol, polyolefin, resorcinol, polyvinyl ether, and silicone adhesives. Further, the pressure-sensitive adhesive layer may be formed using the so-called "two-component crosslinkable pressure-sensitive adhesive" wherein, in use, an isocyanate crosslinking agent, a metal chelate crosslinking agent or the like is added to perform crosslinking. Heat sealants may also be used to form the pressure-sensitive adhesive layer, and examples thereof include ethylene/vinyl acetate copolymer resin, polyamide resin, polyester resin, polyethylene resin, ethylene/isobutyl acrylate copolymer resin, butyral resin, polyvinyl acetate or vinyl acetate copolymer, cellulose derivative, polymethyl methacrylate, polyvinyl ether resin, polyurethane resin, polycarbonate resin, polypropylene resin, epoxy resin, and phenolic resin; thermoplastic elastomers, such as SBS, SIS, SEBS, and SEPS; and reactive hot-melt resins. The thickness of the pressure-sensitive adhesive layer may be 4 to 20 μm.

Tackifier resins (tackifiers), which may be contained in the pressure-sensitive adhesive composition used in the pressure-sensitive adhesive layer, include rosin tackifier resins, terpene tackifier resins, synthetic resin tackifiers, and mixtures of the above tackifiers.

Rosin tackifier resins include, for example, rosin tackifiers, such as gum rosin, tall oil rosin, wood rosin, hydrogenated rosin, esterified rosin, dimerized rosin, polymerized rosin, and limed rosin (for example, Petrosin #80 (tradename; manufactured by Mitsui Petrochemical Industries, Ltd.), refractive index 1.06 (486 nm)]. Terpene tackifier resins include: terpene tackifiers, such as terpene resins including cyclic terpenes (for example, α-pinene, β-pinenecamphor, and dipentene), terpene phenol resin and aromatic modified terpene; synthetic resin tackifiers with five carbon atoms prepared by polymerizing petroleum fractions with five carbon atoms, for example, copolymers of isoprene, cyclopentadiene, 1,3-pentadiene, and 1-pentene, copolymers of 2-pentene and dicyclopentadiene, and 1,3-pentadiene-based resins; synthetic resin tackifiers with nine carbon atoms prepared by polymerizing petroleum fractions with 6 to 11 carbon atoms, for example, copolymers of indene, styrene, methylindene, and α-methylstyrene; and xylene tackifiers [for example, PINECRYSTAL KE-100 (tradename; manufactured by Arakawa Chemical Industries, Ltd.), refractive index 1.59 (486 nm)]. These tackifier resins having a refractive index of about 1.5 to 1.65. The use of a tackifier resin having a large refractive index is advantageous because the amount of the tackifier resin used may be small.

The type and amount of preferred tackifiers, however, are determined from the viewpoint of overall properties including the balance between the tackiness and releasability of the pressure-sensitive adhesive layer and the compatibility of the tackifier resin with the pressure-sensitive adhesive, and the capability of matching the refractive index of the pressure-sensitive adhesive layer to the refractive index of the transparent substrate.

In order to match the refractive index of the pressure-sensitive adhesive layer to the refractive index of the transparent substrate and to easily regulate the refractive index of the pressure-sensitive adhesive layer to a desired value, it is possible to add a material, other than the tackifier resin, having a higher refractive index than the refractive index of the pressure-sensitive adhesive. Such materials include, for example, aromatic compounds, and more specific examples thereof include 3-phenylpyridine, 2-phenylpyridine, diphenyl sulfide, 1,1-diphenylethylene, 1'-diacetonaphthone, and 1-naphthoaldehyde. Further, iodides and bromides of these materials, for example, 1-bromonaphthalene, 1,2-dibromobenzene, and 3-iodoaniline, may also be used.

Alternatively, in order to match the refractive index of the pressure-sensitive adhesive layer to the refractive index of the transparent substrate and to easily regulate the refractive index of the pressure-sensitive adhesive layer to a desired value, it is possible to add a material having a lower refractive index than the refractive index of the pressure-sensitive adhesive. Such materials include, for example, silicone compounds having a refractive index of not more than 1.4 and fluorocompounds.

Silicone compounds include, for example, silicone oils, such as amino-modified silicone oils, epoxy-modified silicone oils, carboxy-modified silicone oils, methacryl-modified silicone oils, and fluorine-modified silicone oils. Commercially available products of these compounds include, for example, "KF-858, refractive index 1.394," manufactured by The Shin-Etsu Chemical Co., Ltd., "KF 96-10, refractive index 1.399", manufactured by The Shin-Etsu Chemical Co., Ltd., and "KF 96L-1, refractive index 1.382," manufactured by The Shin-Etsu Chemical Co.,Ltd. Additional examples thereof include: silane compounds, such as trimethylchlorosilane, methyltrimethoxysilane, methyltriethoxysilane, dimethyldimethoxysilane, and trimethylmethoxysilane; and mixtures of these silane compounds.

Fluorocompounds include tetrafluoroacetic acid, chlorotrifluoroethylene, trifluoromethylbenzaldehyde, 1,4-bistrifluoromethylbenzene, trifluoromethylbenzyl alcohol, and derivatives and mixtures of these compounds.

The pressure-sensitive adhesive layer may be colored with a colorant capable of absorbing the wavelength of light for exposure from the viewpoint of preventing the reflection of exposure light, and the degree of coloration is preferably such that the optical density upon exposure to the light is not less than 2.0.

The light transmission through a light absorbing layer may be expressed by the following equation: $T=e^{-at}$ wherein T represents light transmission through a light absorbing layer, $\alpha$ (a being substituted for $\alpha$ in the equation) represents absorptivity, and t represents layer thickness. The optimal thickness t is 1 to 20 $\mu$m, preferably 2 to 10 $\mu$m. The optimal transmission (normal transmission) is less than 1%. The optimal reflectance is less than 1% even at a photographing angle (=angle of incidence of hologram recording light of about 70 degrees). The optimal light reflectance of the pressure-sensitive adhesive layer at a photographing angle of 50 to 65 degrees is 0.01 to 1%. The light reflectance has also relation to the refractive index of the resin used in each layer. The reflectance decreases with decreasing the difference in refractive index between the layers.

Pigments having a very small particle size may also be used as the colorant. However, the use of dyes is better. Specifically, at least one dye selected from basic dyes, acid dyes, direct dyes, acid mordant dyes, or mordant dyes may be used.

Dyes may be classified by various methods. For example, dyes usable herein may be classified according to chemical structure into azo dyes, anthraquinone dyes, triphenylmethane dyes, pyrazolone dyes, stilbene dyes, diphenylmethane dyes, azomethine dyes, xanthene dyes, alizarine dyes, acridine dyes, quinoneimine dyes (such as azine dyes, oxazine dyes, and thiazine dyes), cyanine dyes, quinoline dyes, thiazole dyes, methine dyes, and nitro dyes.

The pigment is preferably at least one member selected from azo pigments, anthraquinone pigments, indigo pigments, thioindigo pigments, perylene or perinone pigments, quinacridone pigments, dioxazine pigments, quinophthalone pigments, isoindolinone pigments, phthalocyanine pigments, aniline black pigments, or carbon blacks, the particle diameter of these pigments being 0.03 to 0.3 $\mu$m. A mixture of the dye with the pigment may also be used.

Separator

The separator in the self-adhesive film for hologram formation according to the present invention may be a film made of the same material as the support film. However, the separability of the separator is preferably different from that of the support film. Further, the separator may contain the same colorant as contained in the pressure-sensitive adhesive layer.

Peel Strength Relationship Between Layers

The layers in the self-adhesive film for hologram formation according to the present invention has the following peel strength relationship:

[support film/pressure-sensitive adhesive layer]≧[pressure-sensitive adhesive layer/separator]

Transparent Substrate

The transparent substrate used in the dry plate for photographing a hologram according to the present invention may be formed of various materials which are transparent and rigid. Examples of transparent substrate usable herein include various glass substrates, polycarbonate substrates, and acrylic substrates. The provision of a material capable of improving the adhesion (adhesive strength) on the transparent substrate in its side to be provided with the recording material for hologram formation is effective. Thus, if necessary, proper primer treatment of the substrate is useful for improving the adhesion. For example, in the case of a glass substrate, before use, various silane coupling agents, acrylic adhesives, polyurethane adhesives and the like may be coated followed by drying. The transparent substrate may also be used in a dry film form.

On the other hand, a layer formed of an agent capable of regulating the releasability of the pressure-sensitive adhesive layer is preferably provided on the transparent substrate in its side to be provided with the pressure-sensitive adhesive layer. The agent for regulating the releasability may be one for increasing the peel force (increasing the adhesion) or one for decreasing the peel force. Agents for decreasing the peel force include silicone release agents and fluoro release agents.

Protective Layer

Materials usable for the protective layer include, for example, resin films having high transparency and smoothness, such as polyethylene terephthalate films, polyethylene films, polypropylene films, polyvinyl chloride films, acrylic films, triacetylcellulose films, cellulose acetate butyrate films, and polyethylene vinyl alcohol polymer films, the thickness of these films being 1 $\mu$m to 1 mm, preferably 10 $\mu$m to 100 $\mu$m. The protective layer may be formed by laminating the above resin film by means of a rubber roller or the like.

Alternatively, instead of the lamination of the transparent resin film, a coating composition containing a film-forming material, such as triacetylcellulose, polyvinyl alcohol, or polymethyl methacrylate, dissolved therein may be coated by spin coating or the like to form the protective layer.

The resin for the protective layer may be a thermoplastic resin. Alternatively, a thermosetting resin composition using a thermosetting resin or an ionizing radiation-curable resin composition curable by ultraviolet or electron beam irradiation may be used. In this case, the resin composition is coated followed by heating in the case of the thermosetting resin or by irradiation with an ionizing radiation in the case of the ionizing radiation-curable resin to cause crosslinking curing which can further improve various physical and chemical properties and, in this case, when the dry plate for photographing a hologram is exposed followed by heating or the like to perform development, can prevent stretching or contraction of the recording material layer for hologram formation.

When the adhesion of the protective layer to the recording material layer for hologram formation is regulated followed by stacking on the recording material layer for hologram formation in a separable manner, the protective layer may be separated from the dry plate for photographing a hologram at the time of exposure.

Production of Hologram

The dry plate for photographing a hologram according to the present invention may be used in conventional interference exposure and, in addition, may be used in duplication of holograms. In the latter case, the following original plate (1) or (2) is used as the original plate for a hologram: (1) an original plate formed by conducting calculation by means of a computer so as to provide required properties and writing the calculation results for providing the required properties by means of an electron beam exposure system, and (2) a volume hologram or a relief hologram prepared by interference exposure.

In general, the above original plate for a hologram and the dry plate for photographing a hologram according to the present invention are provided, and exposure is performed in such a state that an index matching liquid is interposed between the original plate and the dry plate. The exposure may be performed as follows. If necessary, an index matching liquid (when a relief hologram is used as the original plate, the index matching liquid is not provided between the dry plate for photographing a hologram and the original plate) is coated on the dry plate for photographing a hologram, comprising a transparent substrate having thereon a recording material layer for hologram formation, and/or on the original plate for a hologram in its underside, that is, in its hologram face (=hologram record face). The original plate for a hologram and the dry plate for photographing a hologram are parallely put on top of each other and are brought into intimate contact with each other in such a manner that the hologram face in the original plate for a hologram faces the recording material layer for hologram formation in the dry plate for photographing a hologram. Thereafter, a laser beam is applied to the assembly through the original plate for a hologram on its side remote from the hologram face. This process per se is the same as that in the prior art.

In the exposure, for example, as shown in FIG. 4, a laser beam 10 of an argon laser (wavelength 514.5 nm) or the like is admitted. The exposure causes light 10" diffracted by the original plate for a hologram to interfere with light 10', which has traveled without diffraction, thereby providing hologram information in the recording material layer for hologram formation.

In many cases, aromatic hydrocarbons, which have relatively low polarity, such as xylene, are used as the index matching liquid. Therefore, the index matching liquid is preferably such that, in order to prevent the index matching liquid from flowing into the backside of the recording material for hologram formation and from causing elution of the dye in the pressure-sensitive adhesive layer, the dye contained in the pressure-sensitive adhesive layer is preferably a dye which is soluble in a highly polar solvent and, at the same time, is insoluble in an index matching liquid having a relatively low polarity (typified by xylene).

In the dry plate for photographing a hologram according to the present invention, the transparent substrate has thereon the pressure-sensitive adhesive layer having a refractive index close to that of the transparent substrate. This construction can prevent the reflection of the diffracted light and the light, which has traveled without diffraction, at the interface of the transparent substrate and the outside. When the pressure-sensitive adhesive layer is absent, the reflection of light at the interface of the transparent substrate and the outside creates unnecessary interference fringes in the hologram which, when the hologram is used with a liquid crystal screen, causes the fringes to be mixed into images. By contrast, according to the present invention, the reflection of light can be prevented. Specifically, the light incident on the pressure-sensitive adhesive layer is attenuated by the pressure-sensitive adhesive layer having an optical density of not less than 2.0 as measured with the light. When the light is admitted into the pressure-sensitive adhesive layer having an optical density of 2.0 in a direction normal to the pressure-sensitive adhesive layer, the transmission is reduced to one-hundredth. When the exposure light is incident at an angle to the normal of the original plate for a hologram, the transmission is reduced to less than one-hundredth. Therefore, even though the light reaches the backside of the self-adhesive film, the light is not substantially reflected and returned.

After the exposure, the step of applying ultraviolet light at 0.1 to 10,000 $mJ/cm^2$, preferably 10 to 1,000 $mJ/cm^2$, from a light source, such as an ultrahigh-pressure mercury lamp, a high-pressure mercury lamp, a carbon arc, a xenon arc, or a metal halide lamp, to separate the photopolymerization initiator, or the step of heat treatment, for example, the step of heating at 120° C. for 120 min to diffuse and move the photopolymerizable compound, is carried out to prepare a stable volume hologram. The ultraviolet irradiation or the heat treatment is the step of stabilization and, at the same time, the step of development.

Thereafter, the self-adhesive film is separated to provide a laminate comprising a hologram stacked on the transparent substrate.

The above process can provide a duplicate of the original hologram which as such may be used as a product, or alternatively may be used for large-scale duplication of holograms.

EXAMPLES

In the following examples and comparative examples, the refractive index was measured according to JIS K 7142 (Measuring method for refractive index of plastics).

Example 1

Example Wherein Tackifier Resin is Used in Preferred Amount

SKDYNE 1604 N (tradename; manufactured by Soken Chemical Engineering Co., Ltd.), an acrylic pressure-sensitive adhesive, and PINECRYSTAL KE-100 [tradename; manufactured by Arakawa Chemical Industries, Ltd., refractive index 1.5946 (486 nm)], a xylene tackifier resin, were mixed together in a weight ratio of 6:4. Further, 3.0% by weight of E-AX (tradename; manufactured by Soken Chemical Engineering Co., Ltd.), an epoxy curing agent, was added to the mixture to prepare a refractive index-matched pressure-sensitive adhesive composition which had a refractive index of 1.52 at a hologram photographing wavelength of 486 nm. 0.5% by weight of a red dye Kayaset Red A-BR (manufactured by Nippon Kayaku Co., Ltd.) as a colorant was added to the refractive index-matched pressure-sensitive adhesive composition to prepare a colorant-containing refractive index-matched pressure-sensitive adhesive composition (refractive index 1.52). The pressure-sensitive adhesive composition was evenly coated on a PET film (thickness 50 $\mu$m) as a support film to a thickness of 100 $\mu$m to form a pressure-sensitive adhesive layer. Thus, a self-adhesive film for hologram formation was prepared. A transparent substrate having a refractive index of 1.52 (alkali-free glass 1737, tradename; manufactured by Corning) was then laminated on the self-adhesive film in its pressure-sensitive adhesive layer.

An S-polarized laser beam having a wavelength of 488 nm was admitted at an angle of incidence of 55 to 75 degrees through the surface of the transparent substrate, laminated onto the self-adhesive film for hologram formation, remote from the pressure-sensitive adhesive layer to measure the reflectance. The results are shown in Table 1.

Separately, a recording material for volume hologram formation was coated on the surface of the transparent substrate in the self-adhesive film for hologram formation, with the transparent substrate laminated thereonto, remote from the pressure-sensitive adhesive layer to form a recording material layer for volume hologram formation. As shown in FIG. 4, a protective layer 4, an index matching liquid 7, and an original plate 8 for a hologram were laminated onto the recording material layer 5 for volume hologram formation by the conventional method, followed by photographing of a hologram. Thereafter, the pressure-sensitive adhesive layer 2 was separated to prepare a laminate wherein a hologram was stacked onto the transparent substrate 6. When the adhesive strength of the self-adhesive film was small, this self-adhesive film could be easily separated without leaving any pressure-sensitive adhesive, that is, with good workability.

Comparative Example

For comparison, a self-adhesive film formed by coating a conventional acrylic pressure-sensitive adhesive (refractive index 1.465) on a red PET film to form a pressure-sensitive adhesive layer was stacked onto the same transparent substrate as used in Example 1 to prepare a laminate. A laser beam was admitted into the laminate in the same manner as in Example 1 to measure the reflectance. The results are shown in Table 1.

TABLE 1

| Angle of incidence | Reflectance, % | | | | |
|---|---|---|---|---|---|
| | 55 | 60 | 65 | 70 | 75 |
| Ex. 1 | 0.08 | 0.06 | 0.10 | 0.22 | 0.63 |
| Comp. Ex. | 0.18 | 0.37 | 0.83 | 2.24 | 13.34 |

As is apparent from Table 1, for the self-adhesive film for hologram formation of the example of the present invention, the reflectance was reduced one order of magnitude over the reflectance for the comparative self-adhesive film.

Example 2
Example Wherein Tackifier Resin is Used in Upper Limit of Specified Amount Range SKDYNE 1604 N (tradename; manufactured by Soken Chemical Engineering Co., Ltd.), an acrylic pressure-sensitive adhesive, and PINECRYSTAL KE-100 [tradename; manufactured by Arakawa Chemical Industries, Ltd., refractive index 1.5946 (486 nm)], a xylene tackifier resin, were mixed together in a weight ratio of 4:6. Further, 3.0% by weight of E-AX (tradename; manufactured by Soken Chemical Engineering Co., Ltd.), an epoxy curing agent, was added to the mixture to prepare a refractive index-matched pressure-sensitive adhesive composition which had a refractive index of 1.5435 at a hologram photographing wavelength of 486 nm. A transparent substrate having a refractive index of 1.52 (alkali-free glass 1737, tradename; manufactured by Corning) was then laminated on a self-adhesive film in its pressure-sensitive adhesive layer in the same manner as in Example 1, except that the refractive index-matched pressure-sensitive adhesive composition prepared just above was used. As a result, the tackiness was 50 g/25 mm in terms of peel strength.

An S-polarized laser beam having a wavelength of 488 nm was admitted at an angle of incidence of 55 to 75 degrees through the surface of the transparent substrate, laminated onto the self-adhesive film for hologram formation, remote from the pressure-sensitive adhesive layer to measure the reflectance. The results are shown in Table 2.

TABLE 2

| Angle of incidence | Reflectance, % | | | | |
|---|---|---|---|---|---|
| | 55 | 60 | 65 | 70 | 75 |
| Ex. 2 | 0.05 | 0.09 | 0.16 | 0.35 | 0.90 |

Example 3
Example Wherein Tackifier Resin is Used in Lower Limit of Specified Amount Range SKDYNE 1604 N (tradename; manufactured by Soken Chemical Engineering Co., Ltd.), an acrylic pressure-sensitive adhesive, and PINECRYSTAL KE-100 [tradename; manufactured by Arakawa Chemical Industries, Ltd., refractive index 1.5946 (486 nm)], a xylene tackifier resin, were mixed together in a weight ratio of 8:2. Further, 3.0% by weight of E-AX (tradename; manufactured by Soken Chemical Engineering Co., Ltd.), an epoxy curing agent, was added to the mixture to prepare a refractive index-matched pressure-sensitive adhesive composition which had a refractive index of 1.48 at a hologram photographing wavelength of 486 nm. A transparent substrate having a refractive index of 1.52 (alkali-free glass 1737, tradename; manufactured by Corning) was then laminated on a self-adhesive film in its pressure-sensitive adhesive layer in the same manner as in Example 1, except that the refractive index-matched pressure-sensitive adhesive composition prepared just above was used. For the laminate, the reflectance was measured in the same manner as in Example 1. The results are shown in Table 3.

TABLE 3

| Angle of incidence | Reflectance, % | | | | |
|---|---|---|---|---|---|
| | 55 | 60 | 65 | 70 | 75 |
| Ex. 3 | 0.14 | 0.30 | 0.62 | 1.57 | 8.30 |

Example 4

A 50 μm-thick separator (SP-PET SP 02 (tradename), manufactured by Tokyo Serofan Co., Ltd.) composed of a PET, the surface of which had been subjected to releasability-imparting treatment with silicone, was stacked on the pressure-sensitive adhesive layer in the self-adhesive film A for hologram formation, prepared in Example 1 to prepare a self-adhesive film B for hologram formation, having a layer construction of separator/light-absorbing pressure-sensitive adhesive layer/support film. Further, a self-adhesive film (Fuji Clear (tradename), manufactured by Lintec Corporation) having a layer construction of pressure-sensitive adhesive layer/support film was stacked onto the self-adhesive film B in its PET film as the support film to prepare a pressure-sensitive adhesive film C for hologram formation, having a layer construction of separator/light-absorbing pressure-sensitive adhesive layer/support film/pressure-sensitive adhesive layer/support film.

The separator was removed from the self-adhesive films B and C for hologram formation thus obtained, followed by lamination onto a transparent substrate as used in Example 1. As a result, the performance was equal to that in Example 1.

According to the present invention, the pressure-sensitive adhesive layer is formed of a pressure-sensitive adhesive composition composed of a pressure-sensitive adhesive and, added to the pressure-sensitive adhesive, a material capable of regulating the refractive index of the pressure-sensitive adhesive and the adhesive strength of the pressure-sensitive adhesive, preferably a pressure-sensitive adhesive composition containing 40 to 90% by weight of a pressure-sensitive adhesive and 10 to 60% by weight of a tackifier resin, more preferably a pressure-sensitive adhesive composition containing 40 to 80% by weight of a pressure-sensitive adhesive and 20 to 60% by weight of a tackifier resin. By virtue of this constitution, for example, a tackifier resin having a high refractive index may be used to increase the refractive index of the pressure-sensitive adhesive composition, thereby permitting the refractive index of the pressure-sensitive adhesive layer to be matched so as to reduce the difference in refractive index between the transparent substrate and the pressure-sensitive adhesive layer. Therefore, the reflection of light at the interface of the transparent substrate and the pressure-sensitive adhesive layer can be prevented, contributing to the prevention of halation. Further, even when the angle of incidence of hologram recording light exceeds 50 degrees, particularly 55 degrees, that is, even when the hologram recording light is admitted at a low angle as viewed from the interfacial boundary, more specifically even when the angle of incidence of hologram recording light is 50 to 65 degrees, the light reflectance of the pressure-sensitive adhesive layer is 0.01 to less than 1%, contributing to the prevention of halation.

The amount of the tackifier resin added to the pressure-sensitive adhesive used in the present invention is much larger than the amount of the tackifier resin compounded in conventional pressure-sensitive adhesives. Thus, the tackifier resin functions to lower the adhesive strength of the pressure-sensitive adhesive. According to the present invention, by virtue of the presence of the tackifier resin in the above specified high content range, the pressure-sensitive adhesive layer can be satisfactorily removed without leaving any adhesive or the like when the self-adhesive film is separated after the light exposure of the recording material layer for hologram formation and development.

Since the self-adhesive film for hologram formation according to the present invention has a laminate structure of pressure-sensitive adhesive layer/support film having the above features, a layer for preventing halation at the time of photographing or duplication of holograms can be simply provided in a dry film form. As compared with the formation of an antihalation layer by coating according to the prior art method, the present invention can significantly simplify the production process, and the compatibility with a laminator is also good.

Further, since the self-adhesive film for hologram formation according to the present invention has a laminate structure of pressure-sensitive adhesive layer/support film having the above features, the dry plate for photographing a hologram per se is not soiled, and the antihalation layer (pressure-sensitive adhesive layer) can be easily removed as a film after recording of a hologram. In this case, unlike the antihalation layer formed by coating according to the prior art method, the antihalation layer can be completely removed by a simple step without the need to provide the step of washing with water or the like. Therefore, the self-adhesive film for hologram formation, the dry plate for photographing a hologram, and the method for image formation using the same according to the present invention are suitable for mass production processes.

The self-adhesive film for hologram formation according to the present invention can be used with transparent substrates having various refractive indexes, because the addition of a material capable of regulating the refractive index and adhesive strength of the pressure-sensitive adhesive, preferably a tackifier resin, to the pressure-sensitive adhesive can realize the regulation of the refractive index and adhesive strength of the pressure-sensitive adhesive to respective desired values.

What is claimed is:

1. A self-adhesive film for hologram formation, comprising:
   a support film; and
   a pressure-sensitive adhesive layer provided on the support film, the pressure-sensitive adhesive layer comprising a pressure-sensitive adhesive composition containing a pressure-sensitive adhesive,
   the pressure-sensitive adhesive composition further containing a modifier capable of regulating the refractive index and/or adhesive strength of the pressure-sensitive adhesive composition.

2. The self-adhesive film for hologram formation according to claim 1, wherein the pressure-sensitive adhesive composition contains 40 to 90% by weight of the pressure-sensitive adhesive and 10 to 60% by weight of a tackifier resin, whereby the refractive index of the pressure-sensitive adhesive layer is matched to the refractive index of a transparent substrate for supporting a recording material layer for hologram formation.

3. The self-adhesive film for hologram formation according to claim 1, which further comprises a separator provided on the pressure-sensitive adhesive layer.

4. The self-adhesive film for hologram formation according to claim 1, wherein the pressure-sensitive adhesive composition further contains a colorant.

5. The self-adhesive film for hologram formation according to claim 1, wherein the support film contains a colorant.

6. The self-adhesive film for hologram formation according to claim 1, 2 or 3, wherein the pressure-sensitive adhesive composition is to be used in the formation of a pressure-sensitive adhesive layer in a dry plate for photographing a hologram, the dry plate comprising at least a recording material layer for hologram formation, a transparent substrate, a pressure-sensitive adhesive layer, and a support film stacked in that order as viewed from the dry plate in its side through which a hologram-recording light enters, the pressure-sensitive adhesive layer having a light reflectance of 0.01 to 1% as measured at a 50 to 65-degree angle of incidence of the hologram-recording light to the recording material layer for hologram formation.

7. The self-adhesive film for hologram formation according to claim 1, which is to be used in a dry plate for photographing a hologram, having a layer construction of recording material layer for hologram formation/transparent substrate/pressure-sensitive adhesive layer/support film.

8. The self-adhesive film for hologram formation according to claim 7, wherein the refractive index has been matched so that the difference in refractive index between the pressure-sensitive adhesive layer and the transparent substrate is not more than 0.03.

9. A dry plate for photographing a hologram, comprising recording material layer for hologram formation/transparent substrate/pressure-sensitive adhesive layer/support film, the self-adhesive film for hologram formation according to claim 1 being used in a laminate structure of pressure-sensitive adhesive layer/support film in the dry plate.

10. The self-adhesive film for hologram formation according to claim 1, which further comprises a second pressure-sensitive adhesive layer and a second support film provided in that order on the surface of the support film remote from the pressure-sensitive adhesive layer.

11. A method for image formation, comprising the steps of:

forming a pressure-sensitive adhesive layer comprising a pressure-sensitive adhesive composition containing a pressure-sensitive adhesive on a support film to prepare a self-adhesive film for hologram formation, the pressure-sensitive adhesive composition containing a modifier capable of regulating the refractive index and/or adhesive strength of the pressure-sensitive adhesive composition;

applying the self-adhesive film onto a laminate having a layer construction of recording material layer for hologram formation/transparent substrate in such a manner that the self-adhesive film, either after the removal of a separator when the self-adhesive film has the separator applied thereto or as such when the self-adhesive film has no separator, in its pressure-sensitive adhesive layer side free from the separator, is applied onto the transparent substrate side of the laminate, thereby preparing a dry plate for photographing a hologram having a layer construction of recording material layer for hologram formation/transparent substrate/pressure-sensitive adhesive layer/support film;

bringing an original plate for a transmission hologram into intimate contact with the dry plate for photographing a hologram through an index matching liquid in such a manner that the hologram-recorded face in the original plate faces the recording material layer for hologram formation in the dry plate;

admitting a hologram-recording light and a reference light into the original plate for a hologram, thereby exposing the recording material layer for hologram formation;

developing the exposed recording material layer for hologram formation by the application of an ultraviolet or heat radiation; and separating the self-adhesive film having a layer construction of pressure-sensitive adhesive layer/support film.

12. The method according to claim 11, wherein the self-adhesive film for hologram formation comprising:

a support film; and a pressure-sensitive adhesive layer provided on the support film, the pressure-sensitive adhesive layer comprising a pressure-sensitive adhesive composition containing a pressure-sensitive adhesive, the pressure-sensitive adhesive composition further containing a modifier capable of regulating the refractive index and/or adhesive strength of the pressure-sensitive adhesive composition.

* * * * *